(12) United States Patent
Chien

(10) Patent No.: US 8,245,075 B2
(45) Date of Patent: Aug. 14, 2012

(54) OVERCLOCKING CPU WITH STEPWISE INCREASE IN FREQUENCY BY BIOS GAINING CONTROL UPON INTERRUPT GENERATED AT PREDETERMINED INTERVALS

(75) Inventor: Chih-Cheng Chien, Sanchong (TW)

(73) Assignee: MSI Computer (Shenzhen) Co., Ltd., Shenzhen, Guangdong (CN)

( * ) Notice: Subject to any disclaimer, the term of this patent is extended or adjusted under 35 U.S.C. 154(b) by 534 days.

(21) Appl. No.: 12/432,135

(22) Filed: Apr. 29, 2009

(65) Prior Publication Data

US 2010/0146322 A1 Jun. 10, 2010

(30) Foreign Application Priority Data

Dec. 10, 2008 (TW) ................................ 97147942 A

(51) Int. Cl.
G06F 1/04 (2006.01)
(52) U.S. Cl. ........................................ 713/600; 713/100
(58) Field of Classification Search .................. None
See application file for complete search history.

(56) References Cited

U.S. PATENT DOCUMENTS

| 6,622,254 | B1 | 9/2003 | Kao | |
|---|---|---|---|---|
| 7,100,068 | B2 * | 8/2006 | Shyu | 713/600 |
| 7,996,702 | B2 * | 8/2011 | Xue et al. | 713/501 |
| 2010/0049997 | A1 * | 2/2010 | Tu | 713/300 |
| 2010/0115300 | A1 * | 5/2010 | Wu et al. | 713/300 |

* cited by examiner

Primary Examiner — Kenneth Kim
(74) Attorney, Agent, or Firm — Ming Chow; Sinorica, LLC

(57) ABSTRACT

A method for overclocking a central processing unit (CPU) of a computer motherboard is disclosed. Step A is to set a second frequency of front side bus (FSB) by an operating interface of BIOS. Step B is to determine FSB frequency $F_n$ at each of N stages according to a difference between a first frequency and the second frequency. Step C is to load the CPU with an operating system by booting the CPU at the first frequency of FSB, and send an interruption signal to the CPU from a chipset at predetermined intervals upon completion of the loading of the operating system so as to allow the BIOS to gain control over the CPU, and execute step D by the CPU on each of N occasions of interruption until the FSB frequency of the CPU is changed to the second frequency. Step D is to execute the BIOS by the CPU on the nth occasion of interruption such that the CPU operates at the FSB frequency $F_n$, and allow the operating system to resume control over the CPU.

7 Claims, 3 Drawing Sheets

OVERCLOCKING CPU WITH STEPWISE INCREASE IN FREQUENCY BY BIOS GAINING CONTROL UPON INTERRUPT GENERATED AT PREDETERMINED INTERVALS

FIELD OF THE INVENTION

The present invention relates to methods for overclocking processors, and more particularly, to a method for overclocking a central processing unit of a computer motherboard.

BACKGROUND OF THE INVENTION

U.S. Pat. No. 6,622,254, entitled Method of Automatically Overclocking Central Processing Unit, disclosed a method of automatically overclocking CPUs for use with a computer motherboard by using a frequency generator with functions of tuning frequency and monitoring, and applying a numeric method to get the frequency for booting a computer system, so as to automatically overclocking CPUs, wherein a computer system is powered on and enters the overclocking process, and the built-in parameters storing booting settings are loaded and backed up to be referenced in the next trial of booting. U.S. Pat. No. 6,622,254 further disclosed a plurality of flags for judging current situation of the computer system and being subsequently referenced in the ensuing overclocking process. U.S. Pat. No. 6,622,254 further disclosed the following: booting frequencies are calculated by a numeric method according to the boot frequency of the first trial of booting, the highest frequency generated by frequency generators and the frequency of front side bus (FSB) of the system; and, upon completion of booting, the built-in parameters are stored to boot up a computer system at next time. Once the built-in parameters or the configuration of the computer system is changed, the values of the built-in parameters are invalid and thus have to be recalculated by entering the overclocking process.

However, U.S. Pat. No. 6,622,254 did not disclose loading an operating system at the steadiest CPU frequency after the computer has been powered on and, upon completion of the loading of the operating system, performing an overclocking procedure so as to change the FSB frequency of the CPU.

The inventor of the present invention discovered room for improvement in the prior art and endeavored to improve the prior art, thus inventing a method for overclocking a central processing unit of a computer motherboard.

SUMMARY OF THE INVENTION

It is a primary objective of the present invention to provide a method for overclocking a central processing unit (CPU) of a computer motherboard such that an operating system is loaded at the steadiest CPU frequency after the computer has been powered on, thus allowing an overclocking procedure to be performed upon completion of the loading of the operating system so as to change the front side bus (FSB) frequency of the CPU.

To achieve the above and other objectives, the present invention provides a method for overclocking a central processing unit (CPU) of a computer motherboard. The computer motherboard comprises a central processing unit (CPU), a BIOS, and a chipset. The method comprises steps of: (A) setting a second frequency of front side bus (FSB) by an operating interface of the BIOS; (B) determining FSB frequency $F_n$ at each of a plurality of stages according to the difference between a first frequency and the second frequency, the stages totaling N, and N denoting positive integers, wherein n=1, 2, ..., N; (C) loading the CPU with an operating system by booting the CPU at the first frequency of FSB, sending an interruption signal to the CPU from the chipset at predetermined intervals upon completion of the loading of the operating system so as to allow the BIOS to gain control over the CPU, and executing step (D) by the CPU on each of a plurality of occasions of interruption until the FSB frequency of the CPU is changed to the second frequency, the occasions of interruption totaling N; and (D) executing the BIOS by the CPU on the nth occasion of interruption such that the CPU operates at the FSB frequency $F_n$, and allowing the operating system to resume control over the CPU upon completion of the executing the BIOS.

The present invention is hereunder illustrated with a preferred embodiment in conjunction with the accompanying drawings, so that one skilled in the pertinent art can easily understand the structures, features, and effects of the present invention from the disclosure of the invention.

BRIEF DESCRIPTION OF THE DRAWINGS

The aforesaid objectives, characteristics and advantages of the present invention will be more clearly understood when considered in conjunction with the detailed description of the accompanying embodiment and drawings, in which.

DETAILED DESCRIPTION OF THE INVENTION

Figure 1:
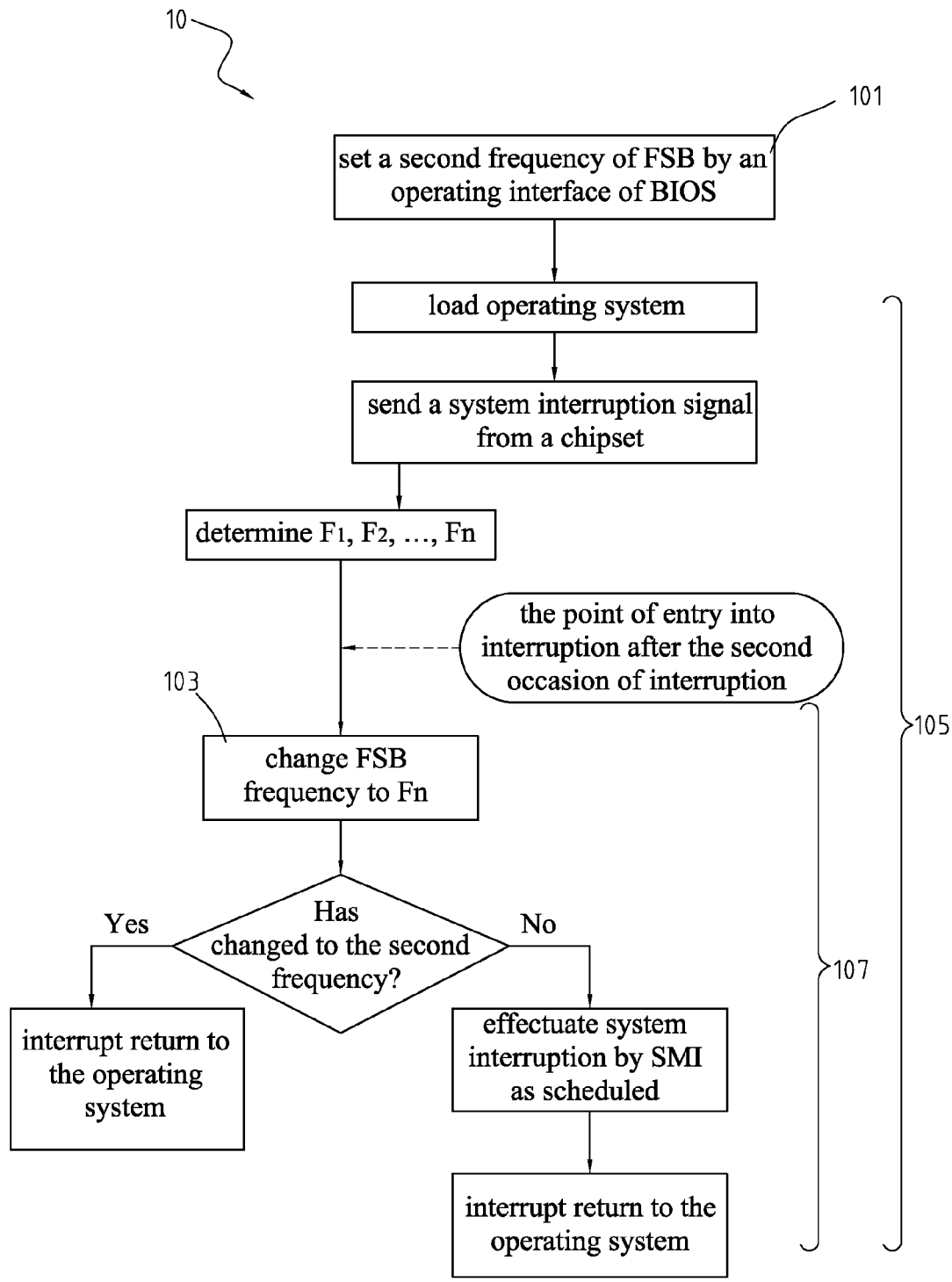
FIG. 1 is a flowchart of a method for overclocking a central processing unit of a computer motherboard according to the present invention.
Figure 2:
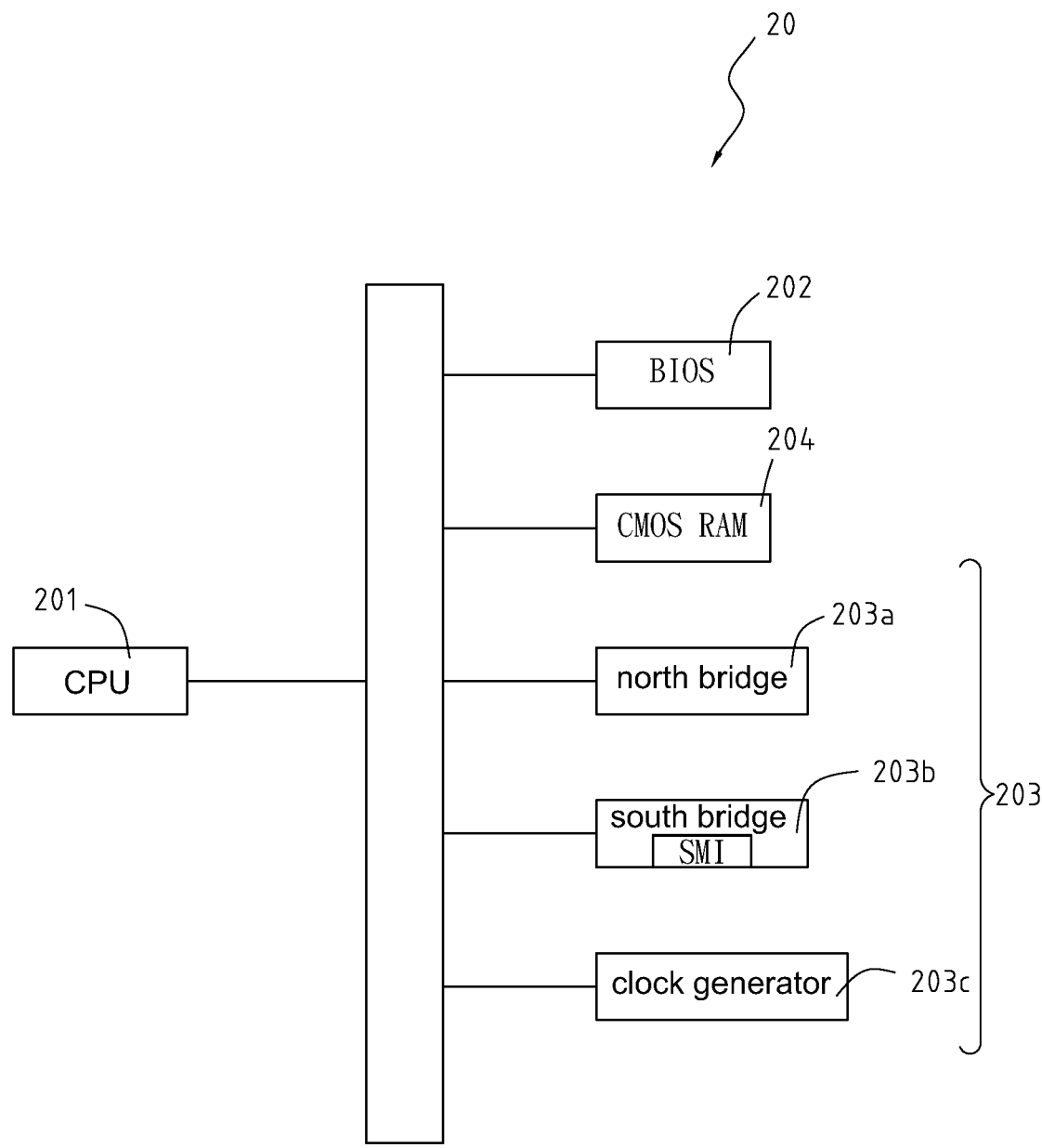
FIG. 2 is a framework diagram of the computer motherboard applicable to the method of the present invention.

FIG. 1 is a flowchart of a method for overclocking a central processing unit of a computer motherboard according to the present invention. FIG. 2 is a framework diagram of the computer motherboard applicable to the method of the present invention. The method for overclocking a central processing unit of a computer motherboard according to the present invention is characterized by: booting a central processing unit (CPU) 201 of a computer motherboard 20 at the steadiest frequency after the computer motherboard 20 has been powered on; loading the CPU 201 with an operating system, such as Microsoft™ Windows® operating system, at the steadiest frequency; and changing front side bus (FSB) frequency of the CPU 201 upon completion of the loading of the operating system. In general, the aforesaid steadiest frequency is the default FSB frequency of the CPU 201, as far as the CPU 201 is concerned.

To perform overclocking (or underclocking) on the CPU 201, a user of the computer motherboard 20 enters the screen of a Basic Input Output System (BIOS) 202 after the power is ON, and specifies a frequency for overclocking (or underclocking) the CPU 201 by means of a BIOS MENU provided by the BIOS 202.

The present invention provides a method 10 for overclocking a central processing unit of the computer motherboard 20. The method 10 comprises step 101 through step 107 as follows.

Figure 3:
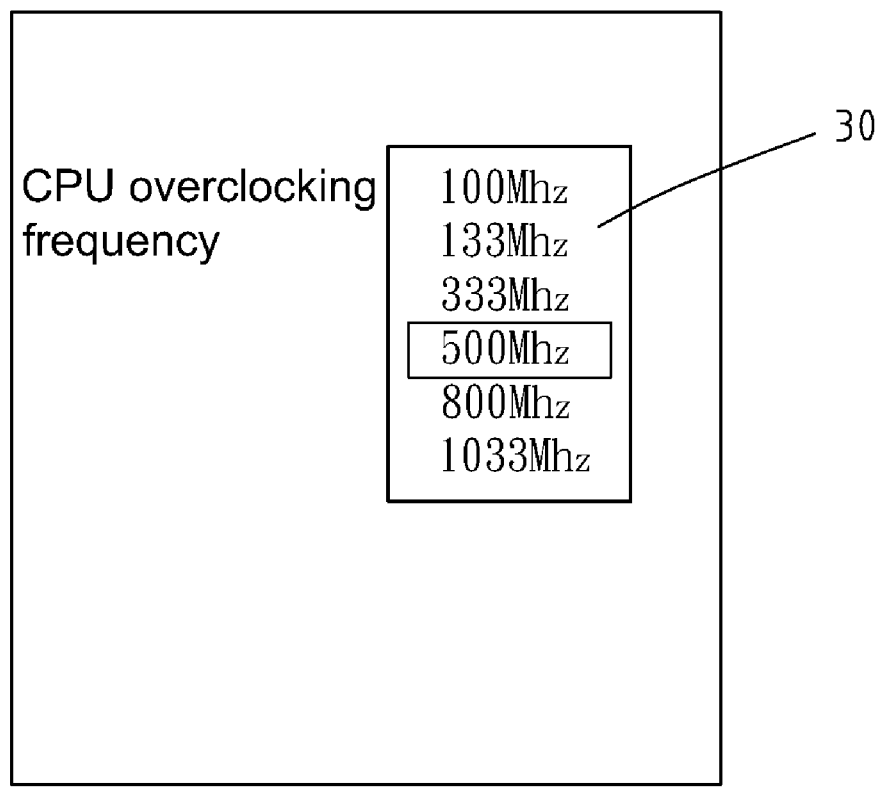
FIG. 3 is a schematic view of a screen which displays overclocking frequency configured by a BIOS using the method of the present invention.

Step 101 involves setting a second frequency of front side bus (FSB) by an operating interface of the BIOS 202. Step 101 is described in detail as follows. The CPU 201 is booted at a first frequency of FSB. Upon a successful boot, the user enters the BIOS 202 and sets the second frequency of FSB by the operating interface of the BIOS 202. To perform overclocking (or underclocking) on the CPU 201, the user enters the screen of the BIOS 202 after the power is ON, and specifies a frequency for overclocking (or underclocking) the CPU 201 by means of a BIOS MENU provided by the BIOS 202. Referring to FIG. 3, one of a plurality of selectable frequencies in a range 30 is selected to be the specified overclocking (or underclocking) frequency, and the specified overclocking (or underclocking) frequency is regarded as the second frequency. For instance, if the user selects 500 Mhz, the second frequency will be 500 Mhz. Specifying a frequency for overclocking (or underclocking) CPU by means of an interface (BIOS MENU) provided by BIOS was previously taught in the prior art. In this regard, the present invention follows the prior art. Step 101 can be programmed such that the resultant code becomes part of the BIOS 202.

As an exemplification, the first frequency is treated as the default FSB frequency of the CPU. For instance, a CPU which has the FSB operating at 333 Mhz is allocated the first frequency at 333 Mhz.

At the end of the setting of the second frequency of FSB in step 101, the second frequency is recorded in the computer motherboard 20. For example, the second frequency is recorded in a CMOS RAM 204 of the computer motherboard 20.

Step 103 involves determining FSB frequency $F_n$ at each of a plurality of stages according to the difference between the first frequency and the second frequency, and the stages total N, wherein N denotes positive integers, with n=1, 2, . . . , N. Step 103 is described in detail hereunder, taking the first frequency of 333 Mhz and the second frequency of 500 Mhz as example as described earlier. In step 103, the difference between the first frequency and the second frequency is 167 Mhz, and N is a positive integer between 1 and 50, say, 20. As an exemplification, the sequence FSB frequencies $F_1$, $F_2$, . . . , $F_n$ is an arithmetic progression with common difference. Given N=20 and the difference of 167 Mhz, the difference between $F_n$ and $F_{n+1}$ is 8.35 Mhz, wherein 8.35 Mhz=167 Mhz/20; in other words, $F_1$=341.35 Mhz, $F_2$=349.7 Mhz, $F_3$=358.05 Mhz, . . . $F_n$=500 Mhz.

The technical measure taken to determine FSB frequency $F_n$ at each of the N stages in Step 103 is not limited to an arithmetic progression with common difference.

Step 103 can be programmed such that the resultant code becomes part of the BIOS 202. Prior to execution of step 105 for the first time, the CPU 201 executes the code in the BIOS 202 regarding step 103, so as to determine FSB frequency $F_n$ at all the stages before going to step 105.

Step 105 involves loading the CPU 201 with an operating system by booting the CPU 201 at the first frequency of FSB, sending an interruption signal to the CPU 201 from a chipset 203 at predetermined intervals upon completion of the loading of the operating system so as to allow the BIOS 202 to gain control over the CPU 201, and executing step 107 by the CPU 201 on each of a plurality of occasions of interruption until the FSB frequency of the CPU 201 is changed to the second frequency, wherein the total number of the occasions of interruption is denoted by N. Step 107 involves executing the BIOS 202 by the CPU 201 on the nth occasion of interruption such that the CPU 201 operates at the FSB frequency $F_n$, and allowing the operating system to resume control over the CPU 201 upon completion of the executing the BIOS 202.

Steps 105 and 107 are described in detail hereunder. After Microsoft™ Windows® operating system, such as Vista® operating system, has been loaded, the BIOS 202 instructs a south bridge chip 203b to generate a system management interruption (SMI) signal according to the specification of Vista® operating system, thereby allowing the BIOS 202 to gain control over CPU for the first time.

The BIOS 202 which has gained control over CPU for the first time executes the code in the BIOS 202 regarding step 103. It is sufficient to execute the code in the BIOS 202 regarding step 103 once; hence, it is not necessary for the BIOS 202 which has gained control over CPU for the second time to execute the code in the BIOS 202 regarding step 103. Then, the CPU 201 goes to step 107. The frequency of the clock generator 203c is set to the frequency $F_1$ by the CPU 201 via a system management bus (SMBus), thereby allowing the CPU 201 to operate at the FSB frequency F1. Afterward, the BIOS 202 executes resumption and enables Vista® operating system to resume control over the CPU 201.

To transfer control over CPU from the operating system to the BIOS 202 on the second, third, . . . , and the nth occasion of system interruption, it is necessary to configure System Management Interrupt (SMI) before the BIOS 202 executes resumption on each of the occasions of system interruption such that the SMI automatically sends a system interruption signal to the CPU 201 as scheduled (for example, in two seconds).

Two seconds after Vista® operating system has resumed control over CPU, the chipset 203 generates an SMI interruption signal whereby the BIOS 202 gains control over CPU for the second time while Vista® operating system is operating. Afterward, the frequency of the clock generator 203c is set to the frequency $F_2$, thereby allowing the CPU 201 to operate at the FSB frequency $F_2$. In two seconds, the SMI sends the system interruption signal to the CPU 201 automatically, and then the BIOS 202 executes resumption and enables Vista® operating system to resume control over the CPU 201 for the second time.

The above steps repeat until the nth occasion of system interruption so as to change the FSB frequency of the CPU 201 to the second frequency.

Steps 105 and 107 can be programmed such that the resultant code becomes part of the BIOS 202.

In step 105, the chipset 203 sends an interruption signal to the CPU 201 at predetermined intervals, wherein each of the predetermined intervals is, preferably, the sum of duration of executing step 107 once by the CPU 201 and an error of the duration.

After the BIOS 202 has executed resumption and enabled Vista® operating system to resume control over CPU, the user can run application software using the operating system to identify the FSB frequency so as to gain insight into the stepwise increase (or decrease) in the FSB frequency of the CPU 201, and in consequence the user can identify the maximum range of the operating frequency of the CPU 201.

Prior to generation of the system interruption signal, information about the current status of the operating system has to be stored such that the operating system can be completely restored to the status previous to the generation of the system interruption signal.

The present invention provides a method for overclocking a central processing unit of a computer motherboard. The method is characterized by loading an operating system at the steadiest CPU frequency after the computer has been powered on and, upon completion of the loading of the operating system, changing the FSB frequency of the CPU stepwise.

The above description serves to expound a preferred embodiment of the present invention rather than limit the scope of application of the present invention. Persons skilled in the art should be able to make obvious changes or modification of the present invention without departing from the substantive disclosure of the present invention.

What is claimed is:

1. A method for overclocking a central processing unit of a computer motherboard, wherein the computer motherboard comprises the central processing unit (CPU), a BIOS, and a chipset, the method comprising steps of:
   (A) setting a second frequency of front side bus (FSB) by an operating interface of the BIOS;
   (B) determining FSB frequency Fn at each of a plurality of stages according to a difference between a first frequency and the second frequency, the stages totaling N, and N denoting positive integers, wherein n=1, 2, ..., N, wherein N is a positive integer;
   (C) loading the CPU with an operating system by booting the CPU at the first frequency of FSB, sending an interruption signal to the CPU from the chipset at predetermined intervals upon completion of the loading of the operating system so as to allow the BIOS to gain control over the CPU, and executing step (D) by the CPU on each of a plurality of occasions of interruption until the FSB frequency of the CPU is changed to the second frequency or the BIOS can not gain control over the CPU, the occasions of interruption totaling N; and
   (D) executing the BIOS by the CPU on the nth occasion of interruption such that the CPU operates at the FSB frequency Fn, and allowing the operating system to resume control over the CPU upon completion of the executing the BIOS.

2. The method of claim 1, wherein the first frequency is default FSB frequency of the CPU.

3. The method of claim 1, wherein the sequence FSB frequencies $F_1, F_2, \ldots, F_n$ in step (B) is an arithmetic progression with common difference.

4. The method of claim 1, wherein the operating system is Windows operating system.

5. The method of claim 1, wherein N, the total of the stages, in step (B) is one of positive integers between 1 and 50.

6. The method of claim 1, wherein each of the predetermined intervals in step (C) is a sum of duration of executing step (D) once by the CPU and an error of the duration.

7. The method of claim 1, wherein the chipset comprises a north bridge chip, a south bridge chip, and a clock generator.

* * * * *